US012756055B2

(12) United States Patent
Yoon et al.

(10) Patent No.: US 12,756,055 B2
(45) Date of Patent: Oct. 6, 2026

(54) BATTERY CELL WITH REVERSIBLE VENT VALVE

(71) Applicant: GM GLOBAL TECHNOLOGY OPERATIONS LLC, Detroit, MI (US)

(72) Inventors: Insun Yoon, Shelby Township, MI (US); Kyungjae Lee, Rochester Hills, MI (US); Nader E. Abedrabbo, Rochester Hills, MI (US); Meinan He, Birmingham, MI (US); Hanho Yun, Oakland Township, MI (US); Fang Dai, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 621 days.

(21) Appl. No.: 18/328,125

(22) Filed: Jun. 2, 2023

(65) Prior Publication Data

US 2024/0405351 A1 Dec. 5, 2024

(51) Int. Cl.
*H01M 50/333* (2021.01)

(52) U.S. Cl.
CPC .................................. *H01M 50/333* (2021.01)

(58) Field of Classification Search
CPC ............. H01M 50/317; H01M 50/325; H01M 50/333; F16K 15/03; F16K 15/033; F16K 15/202
See application file for complete search history.

(56) References Cited

U.S. PATENT DOCUMENTS

2005/0039806 A1* 2/2005 Nakayama .......... F16K 17/0453 137/853
2016/0308344 A1* 10/2016 Brisbane ............. H01M 50/296
2022/0223970 A1* 7/2022 Okabayashi ............ F16K 17/08

FOREIGN PATENT DOCUMENTS

DE 102021123420 A1 * 3/2022 .......... H01M 50/308

OTHER PUBLICATIONS

Pfeiffer,DE 102021123420 A1, Machine Translation (Year: 2022).*

* cited by examiner

*Primary Examiner* — Devina Pillay
(74) *Attorney, Agent, or Firm* — Quinn IP Law

(57) ABSTRACT

A battery cell includes a cathode element, an anode element, and an electrolyte disposed in contact with each of the cathode and anode elements. The battery cell also includes a battery cell case constructed from a rigid material and defining an internal chamber configured to house each of the cathode element, the anode element, and the electrolyte. The battery cell case defines at least one aperture configured to provide a gas path between the internal chamber and an external environment. The battery cell additionally includes a reversible, multiple-use valve assembly mounted to the battery cell case and configured to selectively open a fluid flow through the at least one aperture to relieve a gas pressure within the internal chamber exceeding a predetermined pressure threshold.

14 Claims, 6 Drawing Sheets

BATTERY CELL WITH REVERSIBLE VENT VALVE

INTRODUCTION

The present disclosure relates to a battery cell with a reversible, multiple-use vent valve for mitigation of internal cell pressure.

Electro-chemical battery cells may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries. Electro-chemical batteries may be used to power such diverse items as toys, consumer electronics, and motor vehicles.

An electro-chemical battery includes an anode, i.e., an electrode through which conventional electrical current enters the polarized battery, and a cathode, i.e., an electrode through which electrical current leaves the polarized battery. The anode and cathode electrodes are typically configured as wires or plates, where the anode is the electrode having excess positive charge. Generally, current flow is from cathode to anode via an electrical path external to the battery (with electrons moving in the opposite direction), regardless of the cell type and its operating mode. In secondary cells, cathode polarity with respect to the anode may be positive or negative depending on how the battery is being operated. The electrodes of an electro-chemical battery are typically immersed in an electrolyte that conducts ions as the battery charges or discharges and then sealed in a cell container.

Electro-chemical battery cell containers come in various sizes and shapes depending on energy and power requirements, as well as compartments in which the cell will be housed. Cylindrical, prismatic, and pouch cells containers are widely used, although cylindrical cells are more common. Cylindrical and prismatic battery cells include integrated gas vents to mitigate internal pressures and uncontrolled release of cell electrolyte. Higher cell pressures may result from overcharging due to a faulty charger, external or internal cell shorting, exposure to excessive heat, aging, etc. Generally, the vent is designed to rupture when the internal pressure reaches a critical value. In conventional battery cell designs, the vent is integrated into a battery cell cap plate creating a single-use assembly.

SUMMARY

A battery cell includes a cathode element, an anode element, and an electrolyte disposed in contact with each of the cathode and anode elements. The battery cell also includes a battery cell case constructed from a rigid material and defining an internal chamber configured to house each of the cathode element, the anode element, and the electrolyte. The battery cell case defines at least one aperture configured to provide a gas path between the internal chamber and an external environment. The battery cell additionally includes a reversible, multiple-use valve assembly mounted to the battery cell case and configured to selectively open a fluid flow through the at least one aperture to relieve a gas pressure within the internal chamber exceeding a predetermined pressure threshold.

The battery cell case may be either cylindrical or prismatic.

The valve assembly may include at least one cantilever arm pivotably mounted to the case.

Each cantilever arm may be an elastic element constructed from a rigid material.

The rigid material may be one of spring steel, aluminum, engineered plastic, and ceramic.

The valve assembly may additionally include a valve tip connected to each cantilever arm and configured to selectively open and close the respective aperture.

Each valve tip may include at least a portion thereof constructed from a material configured to withstand temperatures up to 200 degrees Celsius and be chemically resistant to the electrolyte.

The material of at least a portion of each valve tip may be an elastomer.

The valve assembly may include multiple cantilever arms connected at a common attachment point on the battery cell case.

Each cantilever arm may include an adjustable pivot point configured to select the pressure threshold at which the valve assembly opens the corresponding aperture.

Each valve assembly may be additionally configured to open the respective aperture to fill or refill the battery cell case with electrolyte.

The valve assembly may be a wafer check valve spring-loaded against the battery cell case.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as “above”, “below”, “upward”, “downward”, “top”, “bottom”, “left”, “right”, etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
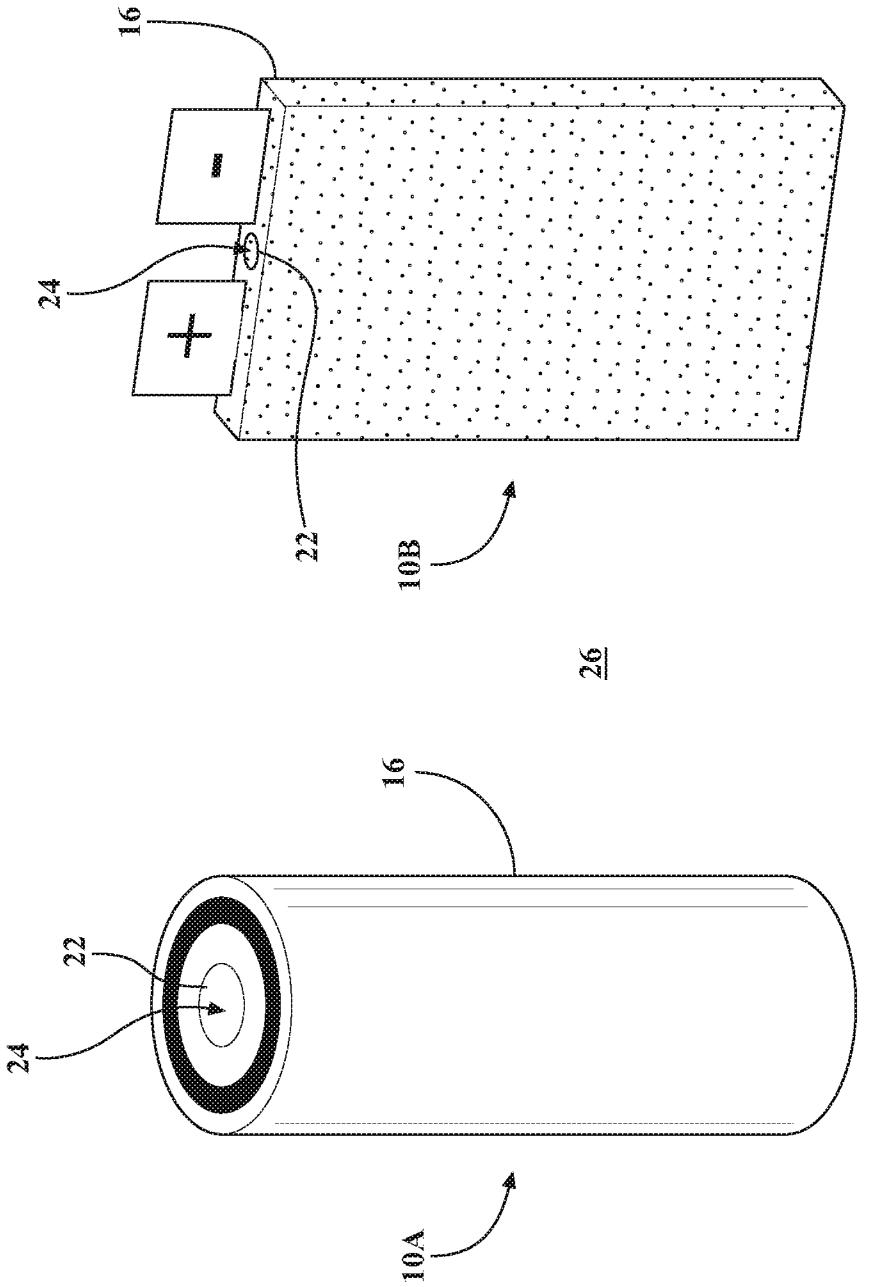
FIG. 1 is a schematic perspective view of exemplary embodiments of a cylindrical battery cell and a prismatic battery cell.

Referring to the figures, two exemplary embodiments of a battery cell are depicted. Specifically, FIG. 1 depicts rigid cylindrical battery cell 10A and a rigid prismatic battery cell 10B. Generally, battery cells generate electrical energy through heat-producing electro-chemical reactions. Additionally, battery cells, such as the cells 10A, 10B may be configured either as primary, i.e., disposable, or secondary i.e., rechargeable, energy storage cells. As a primary energy cell, a battery cell may be configured, for example, as a Lithium, Nickel Cadmium, or Nickel Metal Hydride cell. As a secondary energy cell, a battery may be configured, for example, as a Lithium ion (Li-ion), or Lithium metal cell. Battery cells, such as shown in FIG. 1 may, for example, be employed for operating toys, consumer electronics, and motor vehicles. Multiple cylindrical or prismatic cells may be stacked together in battery modules or packs for enhanced performance in specific applications.

The cylindrical battery cell 10A and the prismatic battery cell 10B generally have similar internal components. As shown schematically in a cut-away state in FIG. 2, an assembled cylindrical battery cell 10A includes an anode 12-1, a cathode 12-2, each immersed in an electrolyte 12-3 formulated to conduct ions as the battery cell 10 discharges or charges, as in the embodiment of a rechargeable battery (such as in an exemplary embodiment of a lithium ion (Li-ion) rechargeable battery). The anode 12-1 is in contact with a negative terminal 14-1, while the cathode 12-2 is in contact with a positive terminal 14-2. The cylindrical battery cell 10A, 10B also includes a sealable, typically hard metal, cell case or container 16. The cell case 16 defines an internal chamber 18 configured to house each of the anode element 12-1, the cathode element 12-2, and the electrolyte 12-3. The anode 12-1 may be a free-standing lithium metal anode or be deposited on a current collector. The cathode 12-2 may be similarly deposited on a current collector. The anode 12-1 may be physically isolated from the cathode 12-2 by a porous separator 20, thereby forming a layered structure, which may then be enclosed within the cell case 16. The cell case 16 is generally sealed, e.g., via crimping, adhesive, or welding, to maintain volatile and reactive species within the cylindrical battery cell 10A during charge/discharge cycling, and to prevent moisture from entering the cell, which is detrimental to the cell’s performance.

Figure 2:
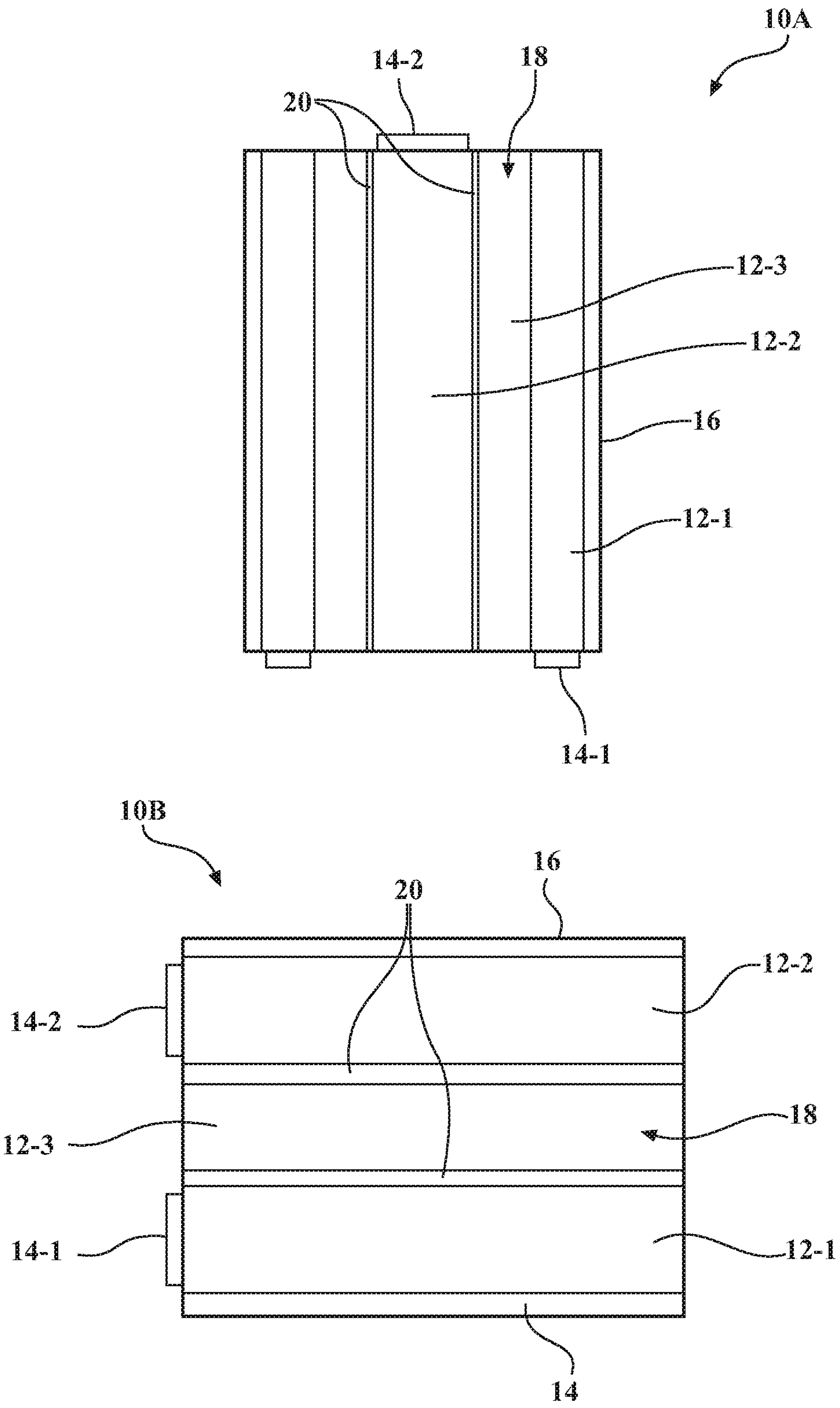
FIG. 2 is a schematic sectional view of the cylindrical and prismatic battery cells shown in FIG. 1.

A rectangular prismatic battery cell 10B is also shown schematically in a cut-away state in FIG. 2. The rectangular prismatic battery cell 10B generally operates like the cylindrical cell 10A and includes a number of functionally analogous components. Namely, the prismatic cell 10B includes the respective anode 12-1 and the respective cathode 12-2. The anode 12-1 is in contact with a negative terminal 14-1, while the cathode 12-2 is in contact with a positive terminal 14-2. The anode 12-1 is physically isolated from the cathode 12-2 by a respective separator 20. As shown, an assembled prismatic battery cell 10B includes a respective rigid cell case 16. Walls of the prismatic cell case 16 are typically constructed from metal. As in the cylindrical cell 10A, the anode 12-1 and the cathode 12-2 of the prismatic cell 10B are immersed in the electrolyte 12-3 and then packaged and sealed within the cell case 16.

Generally, cylindrical and prismatic battery cells are designed and assembled to maintain physical integrity and reliable performance under a variety of external and internal stresses, such as due to vibration and temperature fluctuations. However, during specific situations resulting, for example, from overcharging, external or internal cell shorting, exposure to excessive heat, battery cells may generate excess gases leading to build-up of internal pressure. To prevent an uncontrolled rupture of the respective cell case, cylindrical and prismatic battery cells typically employ non-reversible, i.e., one-time use, vent(s) providing a controlled release of excess pressure. Such non-reversible vents are generally configured as integrated, e.g., preformed and/or welded, non-active covers. The non-reversible vents are designed to break or fracture under excess internal pressure along predetermined boundaries and thereby generate an opening in the respective cell case to exhaust the generated gases into a battery module/pack enclosure or to the ambient. Once such a non-reversible vent is fractured, thereby creating an opening in the battery case to relieve the gas pressure, the battery cell is typically beyond repair and is discarded.

Figure 3:
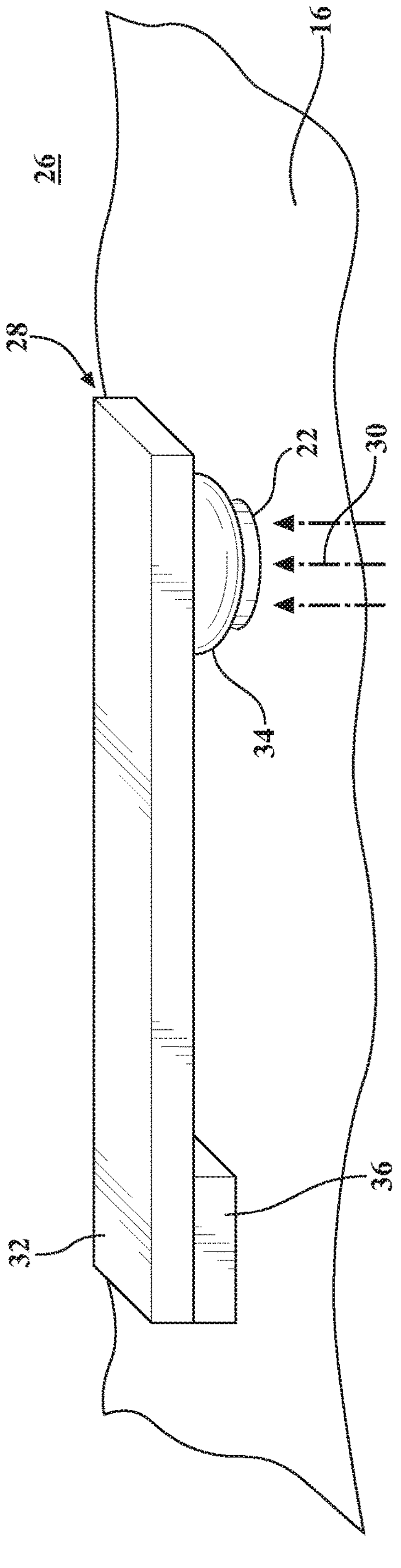
FIG. 3 is a schematic perspective view of a reversible, multiple-use valve assembly mounted to the battery cell case, such as of the cylindrical and prismatic battery cells shown in FIGS. 1 and 2, and having a cantilever arm with a valve tip configured to selectively open and close a case aperture, according to the disclosure.

As shown in FIG. 1, according to the present disclosure, the battery cell case 16 of each of the cylindrical and prismatic battery cells 10A, 10B defines at least one predrilled or preformed aperture 22. Each aperture 22 is configured to provide a gas path 24 between the internal chamber 18 and an external environment 26, such as defined by a battery module/pack enclosure (nor shown) or the ambient external to such an enclosure. As shown in FIG. 3, the battery cell case 16 of each of the cylindrical and prismatic battery cells 10A, 10B also includes a reversible, multiple-use valve assembly 28. The valve assembly 28 is mounted to the battery cell case 16 and configured to selectively open pressure release and fluid flow 30 through the aperture(s) 22.

Specifically, the valve assembly 28 is designed and constructed to relieve gas pressure within the internal chamber 18 exceeding a predetermined pressure threshold $P_t$. The pressure threshold $P_t$ may be approximately 0.1-10,000 Pa. In such capacity, the valve assembly 28 is configured to operate as a gas pressure release device. Following the release of excess pressure from the internal chamber 18, the valve assembly 28 is configured to return to its initial position where it seals the aperture(s) 22 in the battery cell case 16. Accordingly, the valve assembly 28 operating with the aperture 22 is intended to facilitate non-destructive venting of the battery cell 10A. 10B, permitting the corresponding cell case 16 and the vale assembly to be reused following a gas discharge event.

Figure 4:
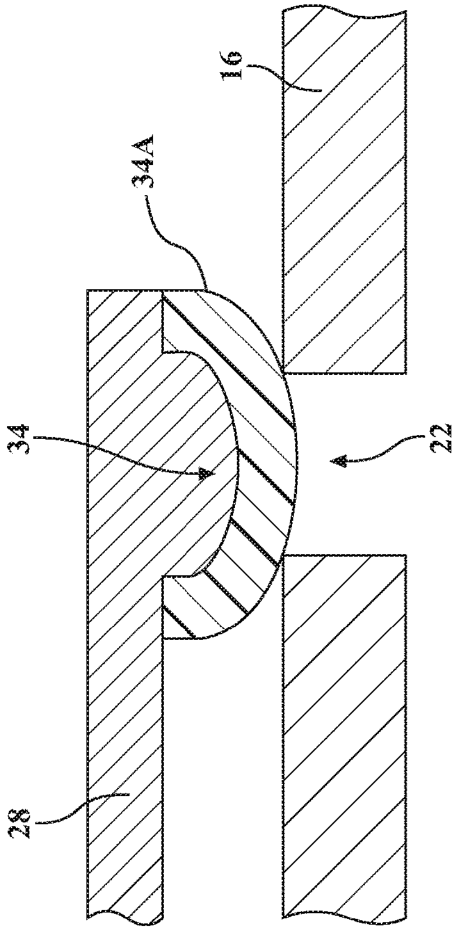
FIG. 4 is a schematic perspective view of an elastomeric portion of the valve tip, according to the disclosure.

With continued reference to FIG. 3, the valve assembly 28 may include cantilever arm(s) 32 pivotably mounted to the battery cell case 16. Each cantilever arm 32 may be an elastic element constructed from a rigid material, such as spring or stainless steel, aluminum, engineered plastic, or ceramic. The valve assembly may additionally include a valve tip 34, e.g., disc or plug, connected to each cantilever arm 32. The valve tip 34 is configured to selectively open and close the respective aperture 22, and thereby block and unblock or control fluid flow therethrough. As shown in FIG. 4, each valve tip 34 may include at least a portion 34A thereof constructed from a material configured to withstand temperatures up to approximately 200 degrees Celsius and be chemically inert, i.e., nonreactive or resistant, to the electrolyte 12-3. The valve tip material may be an elastomer, such as polyolefin, fluorocarbon, or silicone rubber.

Figure 5:
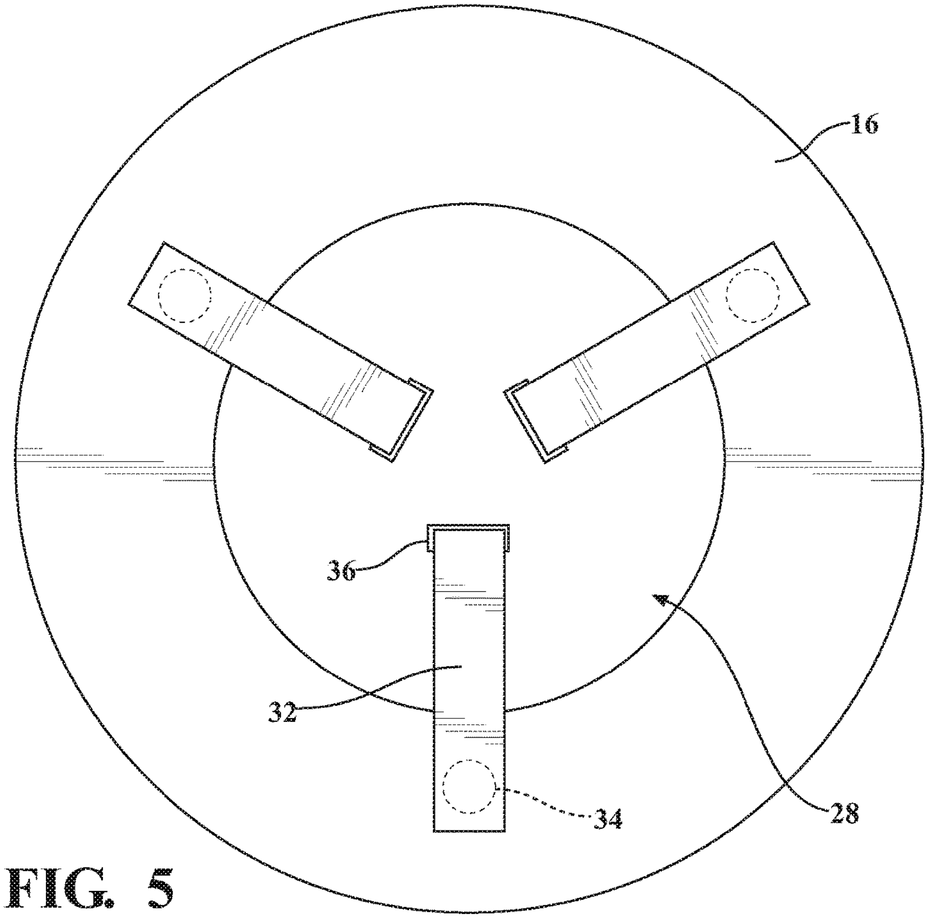
FIG. 5 is a schematic illustration of an embodiment of the valve assembly shown in FIG. 3 having multiple cantilever arms, according to the disclosure.
Figure 6:
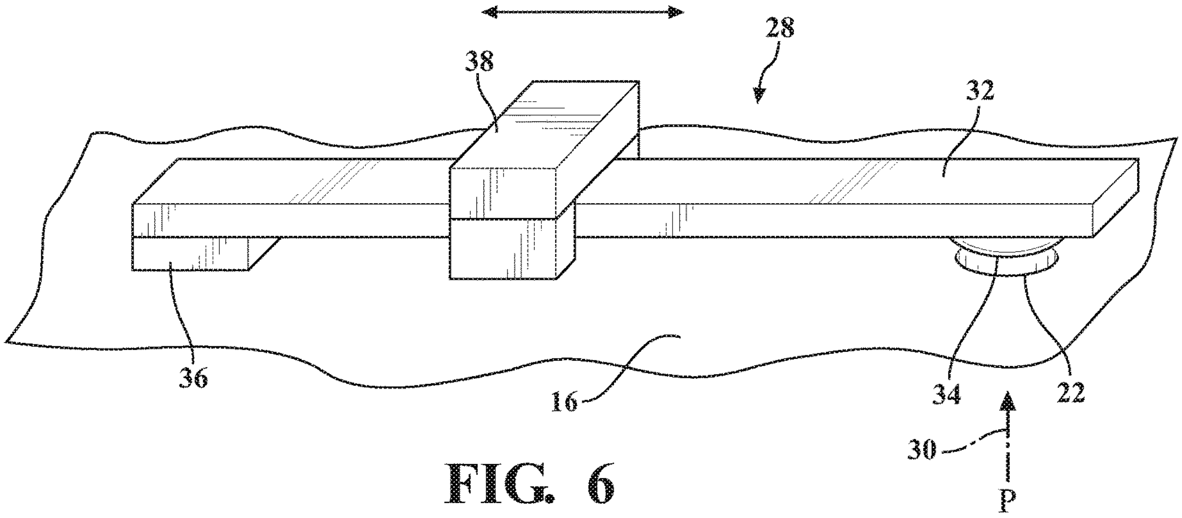
FIG. 6 is a schematic illustration of an embodiment of the valve assembly shown in FIG. 3 having a cantilever arm with an adjustable pivot point, according to the disclosure.

As shown in FIG. 5, the valve assembly 28 may include multiple cantilever arms 32 connected at individual attachment points 36 on the battery cell case 16. Although the embodiment of the multiple cantilever armed valve assembly 28 is shown relative to the cylindrical cell 10A, nothing precludes the same valve construction from being employed in the prismatic cell 10B. As shown in FIG. 6, each cantilever arm 32 may include an adjustable pivot point. The adjustable pivot point may be established via a moveable bracket 38, e.g., sliding relative to the corresponding attachment point 36. The moveable bracket 38 may therefore be configured to select an effective length and spring rate of the cantilever arm 32, and consequently the pressure threshold at which the respective valve assembly 28 opens the corresponding aperture 22.

Figure 7:
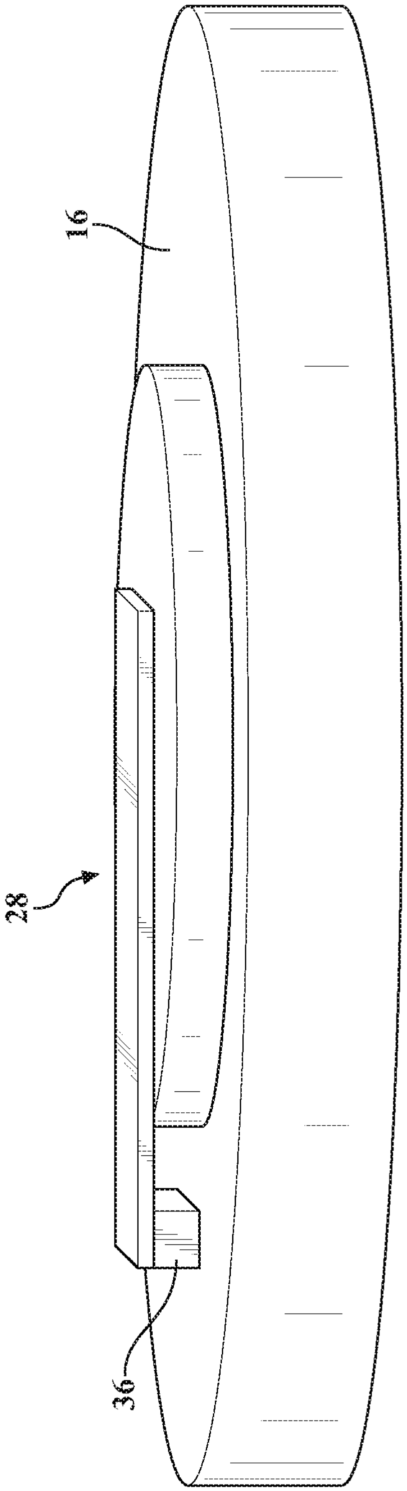
FIG. 7 is a schematic illustration of an embodiment of the valve assembly shown in FIG. 3 including a wafer check valve, according to the disclosure.
Figure 8:
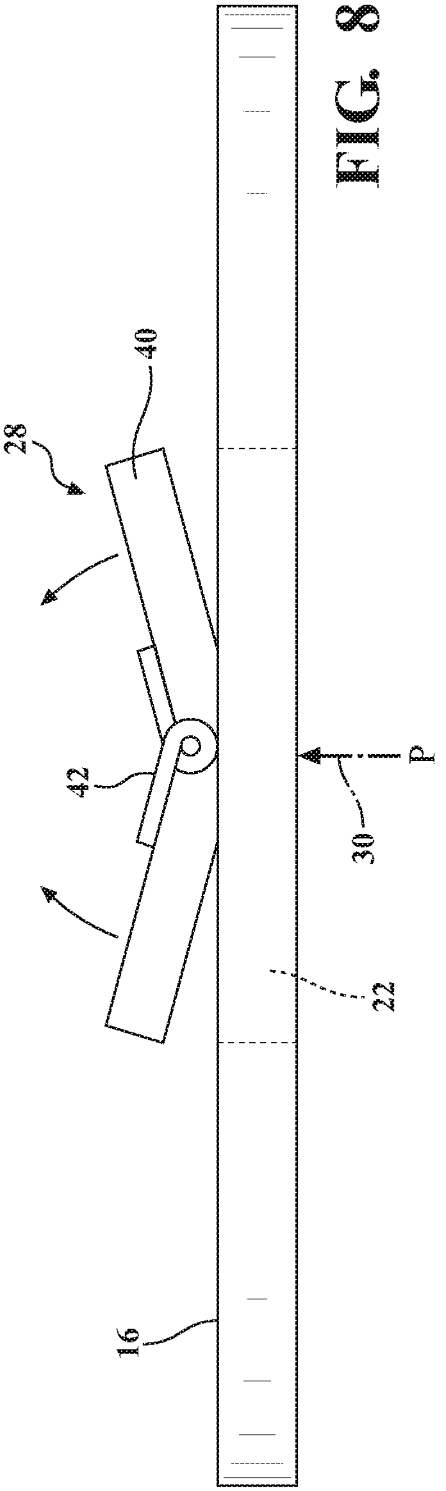
FIG. 8 is a schematic illustration of an embodiment of the wafer check valve assembly shown in FIG. 7 including multiple wafer valve flaps and an elastic element for preloading the wafer flaps against the battery cell case, according to the disclosure.
Figure 9:
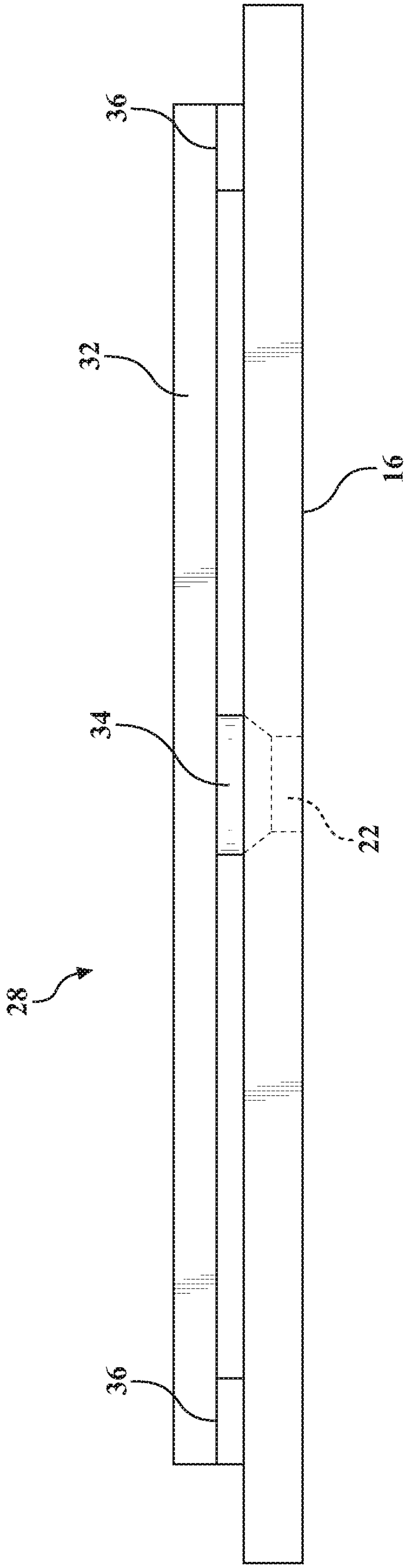
FIG. 9 is a schematic illustration of an embodiment of the valve assembly shown in FIG. 3 having a double cantilever arm with a centrally mounted valve tip, according to the disclosure.

Alternatively, each valve assembly 28 may be configured as a wafer check valve generally shown in FIG. 7. As shown in FIG. 8, the wafer check valve embodiment of the valve assembly 28 may have one or more swinging discs or flaps 40 connected at a common attachment point 36, e.g., a hinge, on the battery cell case 16 to selectively allow or block fluid flow from the battery cell case 16. Each wafer check valve disc 40 may be a molded elastomeric component spring-loaded against the battery cell case 16 via an elastic element 42, such as a torsion spring shown in FIG. 8. The spring rate of the elastic element 42 may be selected to establish the pressure threshold $P_t$ at which the respective valve assembly 28 opens the corresponding aperture 22. With reference to FIG. 9, the cantilever arm 32 may include two opposed attachment points 36 and a centrally mounted valve tip 34. In such an embodiment, the valve assembly 28 may be described as having a double cantilever arm arrangement configured to elastically deflect under the gas pressure in the internal chamber 18 and open the aperture 22.

Each valve assembly 28 may be additionally employed to open the respective aperture 22 to fill the battery cell case 16 with the electrolyte 12-3, such as during initial assembly of the cylindrical cell 10A or the prismatic battery cell 10B or refill the battery cell case following some of the electrolyte having escaped with the vented gases. Accordingly, in such capacity, the valve assembly 28 is configured to operate as a fluid fill and/or refill device. Following each instance the aperture(s) 22 in the battery cell case 16 is opened by the valve assembly 28, the valve assembly returns to its default closed position. The valve assembly 28 may therefore be a reversible, dual-purpose, multiple-use device facilitating convenient electrolyte fill of the battery cell, as well as permitting the battery cell case 16 to be reused, rather than discarded or recycled, following a gas venting event.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery cell comprising:
- a cathode element and an anode element;
- an electrolyte disposed in contact with each of the cathode and anode elements;
- a battery cell case constructed from a rigid material and defining an internal chamber configured to house each of the cathode element, the anode element, and the electrolyte, wherein the battery cell case defines at least one aperture configured to provide a gas path between the internal chamber and an external environment; and
- a reversible, multiple-use valve assembly mounted to the battery cell case and configured to selectively open a fluid flow through the at least one aperture to relieve a gas pressure within the internal chamber exceeding a predetermined pressure threshold;

wherein:
- the valve assembly includes at least one cantilever arm pivotably mounted to the battery cell case; and
- each cantilever arm includes an adjustable pivot point configured to select the pressure threshold at which the valve assembly opens the corresponding aperture.

2. The battery cell of claim 1, wherein each cantilever arm is an elastic element constructed from a rigid material.

3. The battery cell of claim 2, wherein the rigid material is one of spring steel, aluminum, and ceramic.

4. The battery cell of claim 1, wherein the valve assembly additionally includes a valve tip connected to each cantilever arm and configured to selectively open and close the respective aperture.

5. The battery cell of claim 4, wherein each valve tip includes at least a portion thereof constructed from a material configured to withstand temperatures up to 200 degrees Celsius and be chemically resistant to the electrolyte.

6. The battery cell of claim 5, wherein the material of the at least a portion of each valve tip is an elastomer.

7. The battery cell of claim 1, wherein the at least one cantilever arm includes multiple cantilever arms connected at a common attachment point on the battery cell case.

8. A battery cell case defining an internal chamber and at least one aperture providing a gas path between the internal chamber and an external environment, the battery cell case comprising:
- a reversible, multiple-use valve assembly configured to selectively open a fluid flow through the at least one aperture to relieve a gas pressure within the internal chamber exceeding a predetermined pressure threshold;

wherein:
- the valve assembly includes at least one cantilever arm pivotably mounted to the battery cell case; and
- each cantilever arm includes an adjustable pivot point configured to select the pressure threshold at which the valve assembly opens the corresponding aperture.

9. The battery cell case of claim 8, wherein each cantilever arm is an elastic element constructed from a rigid material.

10. The battery cell case of claim 9, wherein the rigid material is one of spring steel, aluminum, and ceramic.

11. The battery cell case of claim 8, wherein the valve assembly additionally includes a valve tip connected to each cantilever arm and configured to selectively open and close the respective aperture.

12. The battery cell case of claim 11, wherein each valve tip includes at least a portion thereof constructed from a material configured to withstand temperatures up to 200 degrees Celsius and be chemically resistant to a battery cell electrolyte.

13. The battery cell case of claim 8, wherein the at least one cantilever arm includes multiple cantilever arms connected at a common attachment point on the battery cell case.

14. A battery cell comprising:

a cathode element and an anode element;

an electrolyte disposed in contact with each of the cathode and anode elements;

a battery cell case constructed from a rigid material and defining an internal chamber configured to house each of the cathode element, the anode element, and the electrolyte, wherein the battery cell case defines at least one aperture configured to provide a gas path between the internal chamber and an external environment; and a reversible, multiple-use valve assembly mounted to the battery cell case and configured to selectively open a fluid flow through the at least one aperture to relieve a gas pressure within the internal chamber exceeding a predetermined pressure threshold;

wherein:

the valve assembly includes at least one cantilever arm pivotably mounted to the battery cell case;

each cantilever arm includes an adjustable pivot point configured to select the pressure threshold at which the valve assembly opens the corresponding aperture; and the valve assembly includes a valve tip connected to each cantilever arm and configured to selectively open and close the respective aperture.

* * * * *